United States Patent [19]

Ensey

[11] 4,288,940
[45] Sep. 15, 1981

[54] RODENT TRAP GUARD

[76] Inventor: Rick A. Ensey, Fairfield Bay, Ark. 72088

[21] Appl. No.: 134,654

[22] Filed: Mar. 27, 1980

[51] Int. Cl.³ .......................................... A01M 23/00
[52] U.S. Cl. ..................................................... 43/58
[58] Field of Search .................... 43/58, 96, 73, 74, 75

[56] References Cited

U.S. PATENT DOCUMENTS

| | | | |
|---|---|---|---|
| 1,510,346 | 9/1924 | Smith | 43/74 |
| 2,256,048 | 9/1941 | Evans | 43/75 |
| 2,433,913 | 1/1948 | Kness | 43/74 |

FOREIGN PATENT DOCUMENTS 117115 10/1926 Fed. Rep. of Germany .......... 43/58

Primary Examiner—Stephen G. Kunin
Assistant Examiner—Robert P. Olszewski
Attorney, Agent, or Firm—Hiram A. Sturges

[57] ABSTRACT

A rodent trap guard having a hollow housing receiving a trap, the housing having opposite open ends for rodent access and for trap insertion. The upper side of the housing having a trap viewing opening, the guard being of a strength for substantial protection of the trap from forklift collision.

9 Claims, 2 Drawing Figures

RODENT TRAP GUARD

BACKGROUND OF THE INVENTION

Rats and mice account for millions of dollars of loss each year in this country because of the damage they do at farms, food plants, hospitals, restaurants, and even any kind of commercial building.

In addition, food plants are compelled by government regulations to be free of rodents. These factors have caused owners to hire professional pest control companies to install traps, and also to maintain the traps. The most popular kind of trap today is the trap called the "wind-up automatic trap". It has a spring that is wound up by an operator by a key, it has an opening through which the rodent passes, attracted, surprisingly enough, by nothing more than the hole itself. It seems to the rodent like a good place to hide.

The trip mechanism inside such traps operate a paddle which is spring-operated to flip the mouse into a compartment in the trap from which there is no escape.

However, such traps are very expensive. The cost, even in quantity buying to a pest control company, is often approximately $6.00 per trap. When such traps are destroyed by being struck by wooden pallets being carried by forklift trucks, they become useless, and worse yet, the mice and rats can operate freely in that area until they are replaced.

The replacement cost of such a trap has been a great problem for many, many years without a solution. Use of these expensive traps and this problem have existed more than a decase.

An objective of this invention is, therefore, to provide a trap guard of strong steel and of minimum cost capable of extending around and protecting an expensive trap of this kind, leaving at least one end open for access to the winding key of the trap and for access by the rat to the hole by which he enters.

Another objective of this invention is to provide the trap guard with an open top so that when a flashlight is shined through holes in the front of the trap, the operator can look through the trap guard top opening and down through other holes in the trap and can see whether or not there are rodents in the trap, and whether the rodents are alive. If the animal is dead, the trap is then emptied. If the animal is alive, then it can be left in the trap, since mice die in 24 hours and small rats die quickly, too, from starvation, although mainly from lack of water supply.

The larger rats and the very large Norway rats are not involved, since they are too large for these traps anyway.

Another objective is to make a trap with one side closed. Although the closed side is usually used on the bottom, yet, if there is real danger in an area of something falling on the trap, then the open side is left downward and the closed side is turned upward.

The front and back ends of the trap guard are both open because there is an entrance hole for the rodent on both the front and back sides of the trap.

Economy is achieved by using a spacer bar construction with the middle of the top of the guard with the spacer bars of heavier material, such as one-fourth inch steel plate, and with the remainder of the guard made of the less expensive three-sixteenths inch steel plate bent to form. Economy is very important because of the great number of trap guards needed, even by a single pest control company.

A particular reason a guard has long been needed is because of intentional destruction by humans. Forklift truck operators have been making a game out of crushing the traps, sometimes with the front wheels of their forklift, sometimes with the back wheels, sometimes with the "spears" at the front of the forklift, and sometimes with the wooden pallet being carried. The risk of being caught by management is considerable, but it seems that such games help take care of the problem of boredom.

SUMMARY OF THE INVENTION

A main goal of this invention is to provide a rodent trap guard having a hollow housing receiving a trap, the housing having opposite open ends for rodent access and for trap insertion. The upper side of the housing having a trap viewing opening, the guard being of a strength for substantial protection of the trap from forklift collision.

Another goal of this invention is for the trap guard to have an open top except for two thick steel bars interconnecting the sides and welded to the remainder of the housing.

A further goal is to provide the tops of the sides with inwardly extending portions joined to the bars.

DESCRIPTION OF THE PREFERRED EMBODIMENT

Figure 1:
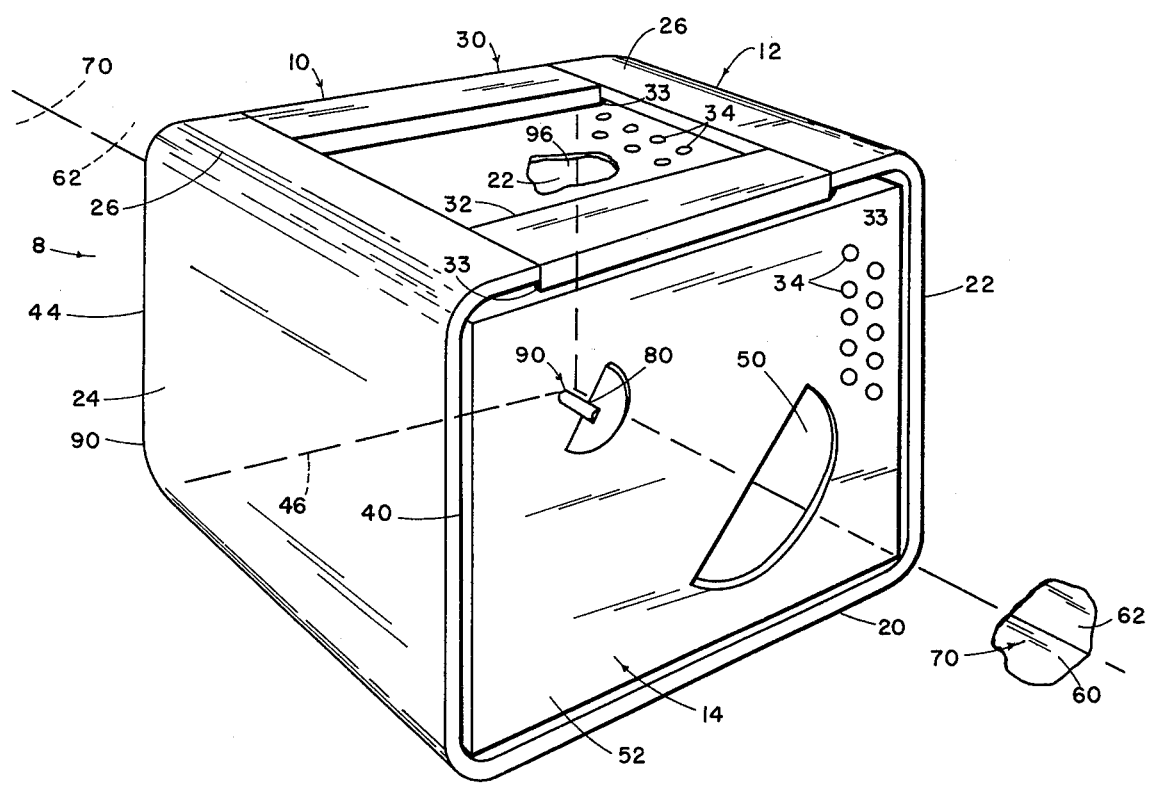
FIG. 1 is a perspective view of the rodent trap and guard assembly shown in position on the floor of a building and against a wall thereof, the trap being broken away at an upper center of FIG. 1 for showing how the back side of a guard is open similarly to a front side.
Figure 2:
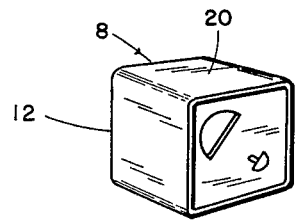
FIG. 2 shows how the guard can be inverted with respect to the trap for still greater protection from being struck from above.

In FIG. 1 a rodent trap guard and trap assembly 8 has a rodent trap guard, generally indicated at 10, which comprises a hollow housing 12, which receives and protects a hollow housing 12, which receives and protects a trap 14.

The housing 12 has a bottom section 20 about 9" by 10". A right side section 22 and a left side section 24 of the housing 12 are disposed at opposite ends of the bottom section 20 and extend upwardly therefrom about 6⅛ inches.

The right section 22 and the left section 24 each have upper portions 26 9" long which are each bent inwardly and extend inwardly about an inch towards one another and approximately parallel with the bottom section 20.

A top section generally indicated at 30 extends between right and left section upper portions 26 for protection of the top of the trap. The top or upper section 30 comprises steel bars 32 at the forward and rearward sides of the trap guard, welded to the upper portion 26 at 33, and spaced apart so as to allow viewing of the contents of the trap through viewing holes 34 at times when a flashlight, not shown, is aimed through the holes 34.

The entire housing 12 is constructed of a material, such as steel, which is of sufficient strength and of dimensions for providing substantial trap protection when the housing is struck by a fork lift at common factory speeds, or struck by items carried by a forklift, such as a pallet.

The bars 32 are ¼" thick but the rest of the housing 12 is of 3/16" thickness.

All dimensions can be varied, yet the dimensions stated have been discovered to be effective in steel manufacture.

The housing also has a forward side 40 and a rearward side 44, both of which are open to allow for inserting and removing the trap 14.

The trap 14 has a rodent entrance opening 50 on its front side 52 which is in alignment with the open front side of the housing 40 when the trap is enclosed therein.

Viewing holes 34 are also found on the front side 52 of the trap 14.

The trap 14 in its trap guard 10 generally sits on a floor 60 of a building 70 at a point at which the floor 60 meets with a vertical side wall 62, as small rodents generally run along a wall seeking a hiding place and choose the opening 50.

A winding handle is shown at 80 because the trap has a spring and winding assembly generally indicated at 90 which is wound by the handle 80.

The back side of the trap guard is open identically to the front side whereby it has an opening 96 completely extending from the side section 22 to the side section 24.

The trap 14 is of a spring wound type manufactured by Kneiss Company and is called a "CATCH-ALL" trap and it closely but slidably fits the inside of the hollow housing 10.

As best seen in FIG. 1, the vertical thickness of the guard top section is substantially greater than the vertical thickness of the trap top section so as to protect the trap.

I claim:

1. A rodent trap guard and trap assembly comprising a trap having end walls at least one of which has an entrance opening therethrough, said trap having a top wall having at least one viewing hole therethrough for viewing the interior of the trap from the outside, and a guard, said guard having a hollow housing for receiving a trap comprising a bottom section, right and left side sections, each of said sections being formed of material which is strong enough for substantial rigid protection from collision with forklift trucks and their contents, said right and left side sections extending upwardly from said bottom section, at least one end of said housing a opening in registry with said trap entrance opening being rodent access, said guard having a top guard section comprising means extending between said right and left side guard sections for covering the top of said trap, said top guard section having a guard viewing opening therethrough disposed in registry with said trap viewing opening, said top guard section being substantially stronger than said trap top section for protective purposes.

2. The rodent trap guard of claim 1 wherein said top section comprises bar means extending between and attached to said right and left sections.

3. The rodent trap guard of claim 2 wherein said bar means comprises two bars sufficiently spaced apart to allow viewing of said trap between said bars.

4. The rodent trap guard of claim 1 having upper portions of said right and left sections bent inwardly towards one another.

5. The rodent trap guard of claim 1 wherein said housing is constructed of steel and has upper portions on each of said right and left side sections which extend inwardly toward one another.

6. The rodent trap guard of claim 3 having said side and bottom sections being disposed of a lesser thickness of steel than said bars.

7. The rodent trap guard and trap assembly of claim 1 having said guard being substantially all made of steel.

8. The rodent trap guard and trap assembly of claim 7 having said guard top section being made of substantially thicker material than said trap top section for protection of said trap.

9. The rodent trap-guard and trap assembly of claim 1 having said sidewalls of said housing being made of at least substantially a 3/16-inch thickness.

* * * * *